US011735158B1

(12) United States Patent
Gupta et al.

(10) Patent No.: US 11,735,158 B1
(45) Date of Patent: Aug. 22, 2023

(54) VOICE AGING USING MACHINE LEARNING

(71) Applicant: Electronic Arts Inc., Redwood City, CA (US)

(72) Inventors: Kilol Gupta, Redwood City, CA (US); Zahra Shakeri, Newark, CA (US); Ping Zhong, Mountain View, CA (US); Siddharth Gururani, Bellevue, WA (US); Mohsen Sardari, Burlingame, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 17/399,592

(22) Filed: Aug. 11, 2021

(51) Int. Cl.
*G10L 15/16* (2006.01)
*G10L 15/00* (2013.01)
*G10L 21/00* (2013.01)
*G10L 25/00* (2013.01)
*G10L 13/027* (2013.01)
*G10L 25/30* (2013.01)
*G10L 13/047* (2013.01)

(52) U.S. Cl.
CPC .......... *G10L 13/027* (2013.01); *G10L 13/047* (2013.01); *G10L 25/30* (2013.01)

(58) Field of Classification Search
CPC .......... G10L 21/00; G10L 15/00; G10L 15/16
See application file for complete search history.

(56) References Cited

U.S. PATENT DOCUMENTS

2021/0390944 A1* 12/2021 Richards ................ G06F 3/167
2022/0148561 A1* 5/2022 Gupta ..................... G10L 25/69

FOREIGN PATENT DOCUMENTS

| | | | | |
|---|---|---|---|---|
| CN | 110956966 | A | * | 4/2020 |
| CN | 111161728 | A | * | 5/2020 |
| CN | 112019972 | A | * | 12/2020 |
| CN | 112652292 | A | * | 4/2021 |
| CN | 113133605 | A | * | 7/2021 |
| CN | 113643684 | A | * | 11/2021 |
| JP | 2020064151 | A | * | 4/2020 |
| KR | 20210057569 | A | * | 5/2021 |

* cited by examiner

*Primary Examiner* — Shreyans A Patel
(74) *Attorney, Agent, or Firm* — Gray Ice Higdon

(57) ABSTRACT

This specification describes systems and methods for aging voice audio, in particular voice audio in computer games. According to one aspect of this specification, there is described a method for aging speech audio data. The method comprises: inputting an initial audio signal and an age embedding into a machine-learned age convertor model, wherein: the initial audio signal comprises speech audio; and the age embedding is based on an age classification of a plurality of speech audio samples of subjects in a target age category; processing, by the machine-learned age convertor model, the initial audio signal and the age embedding to generate an age-altered audio signal, wherein the age-altered audio signal corresponds to a version of the initial audio signal in the target age category; and outputting, from the machine-learned age convertor model, the age-altered audio signal.

20 Claims, 8 Drawing Sheets

VOICE AGING USING MACHINE LEARNING

FIELD

This specification describes systems and methods for aging voice audio, in particular voice audio in computer games.

BACKGROUND

As people age, the characteristics of their voices change. In video games, a player character may be part of a progression/storyline wherein the character ages as the game progresses. If a character voice does not age with the character, game immersion may be broken. Furthermore, storing multiple versions of the speech of a game character at different ages is memory inefficient.

SUMMARY

According to a first aspect of this specification, there is described a method for aging speech audio data. The method comprises: inputting an initial audio signal and an age embedding into a machine-learned age convertor model, wherein: the initial audio signal comprises speech audio; and the age embedding is based on an age classification of a plurality of speech audio samples of subjects in a target age category. The method further comprises processing, by the machine-learned age convertor model, the initial audio signal and the age embedding to generate an age-altered audio signal, wherein the age-altered audio signal corresponds to a version of the initial audio signal in the target age category; and outputting, from the machine-learned age convertor model, the age-altered audio signal.

The age embedding may be generated using an age classification model. The age classification model takes as input an input audio sample and outputting an age classification of the input audio sample. The age classification model may comprise a plurality of layers, and wherein the age embedding is generated from output of an intermediate layer of the age classification model. The age embedding may be based on an average of a plurality of sample embeddings, each sample embedding generated from an audio sample in the target range using the age classification model. The age classification model may comprise one or more of: a neural network; a convolutional neural network; a fully connected deep neural network; or an autoregressive model.

The initial audio signal may be generated from text using a text-to-speech model. The text may be character dialogue in video game.

The machine-learned age convertor model comprises: an autoregressive sequence-to-sequence model; LSTM model; GAN-based mode; or a transformer model.

The method may further comprise inputting a representation of a target gender into the machine-learned age convertor model, and wherein the age-altered audio signal further corresponds to an audio signal with the target gender.

According to a further aspect of this specification, there is described a method of training a machine-learned age convertor model. The method comprises: inputting an initial audio signal and an age embedding into a parametrized age convertor model, wherein: the initial audio signal comprises speech; and the age embedding is based on an age classification of a plurality of speech audio samples of subjects in a target age category. The method further comprises processing, by the parametrized age convertor model, the initial audio signal and the age embedding to generate a candidate age-altered audio signal; outputting, from the parametrized age convertor model, the candidate age-altered audio signal; and updating parameters of the parametrized age convertor model based on a comparison of the candidate age-altered audio signal to a ground truth audio signal taken at the target age category.

The age embedding may be generated using an age classification model, the age classification model taking as input an input audio sample and outputting an age classification of the input audio sample. The age classification model may comprise a plurality of layers, and the age embedding is generated from output of a layer of the age classification model. The age embedding may be based on an average of a plurality of sample embeddings, each sample embedding generated from an audio sample in the target range using the age classification model. The age classification model may comprise one or more of: a neural network; a convolutional neural network; a deep neural network; or an autoregressive model.

Updating parameters of the parametrized age convertor model based on a comparison of the candidate age-altered audio signal to a ground truth audio signal taken at the target age category may comprise: determining a loss between the candidate age-altered audio signal and the ground truth audio signal, wherein the loss is based on a norm of the difference between the candidate age-altered audio signal and the ground truth audio signal; and updating the parameters of the parametrized age convertor model based on the loss.

The machine-learned age convertor model may be an autoregressive sequence-to-sequence model; LSTM model; GAN-based mode; or a transformer model.

According to a further aspect of this specification, there is described a method of training an age classifier model to generate age embeddings of speech audio signals. The method comprises: for each of a plurality of speech audio samples, each associated with a ground truth age classification: inputting the speech audio sample into an age classification model; processing the input speech audio sample using the age classification model to generate a candidate age classification for the input speech audio sample; and extracting an age embedding for the speech audio sample from the age classification model. The method further comprises updating parameters of the age classifier model based on values of a loss function. The loss function comprises: a classification loss between the candidate age classifications and the corresponding ground truth age classifications of the speech audio samples; and an age embedding loss comparing a plurality of age embeddings of audio speech samples with the same ground truth age classification.

The age embedding loss may penalise differences between age embeddings of audio speech samples with the same ground truth age classification.

The loss function may further comprise an identity loss comparing age embeddings of audio speech samples from different ground truth age classifications that captured from an identical individual, wherein the identity loss penalises similar embeddings of audio speech samples.

The age classifier model may comprise a neural network, a convolutional neural network, a fully connected neural network or autoregressive model.

The following terms are defined to aid the present disclosure and not limit the scope thereof.

A "user" or "player", as used in some embodiments herein, is preferably used to connote to an individual and/or the computing system(s) or device(s) corresponding to (e.g., associated with, operated by) that individual.

A "client", as used in some embodiments described herein, preferably used to connote a software application with which a user interacts, and which can be executed on a computing system or device locally, remotely, or over a cloud service.

A "server", as used in some embodiments described here, is preferably used to connote a software application configured to provide certain services to a client, e.g. content and/or functionality.

A "video game", as used in some embodiments described herein, is preferably used to connote a virtual interactive environment in which players engage. Video game environments may be facilitated through a client-server framework in which a client may connect with the server to access at least some of the content and functionality of the video game.

An "embedding", as used in some embodiments described herein, is preferably used to connote a representation of an entity/property as an ordered collection of numerical values. Examples of such ordered collections include, but are not limited to, vectors, matrices and other arrays.

The term "aging" is used to describe the action of the systems and methods described herein. This term is preferably used to connote changing the age of an audio sample in either direction, i.e. increasing the age of an audio sample or decreasing the age of an audio sample.

DETAILED DESCRIPTION

In video games where players' characters go into a progression/storyline wherein the character ages as the game progresses, synthesizing speech for these characters or non-player characters which realistically changes as the character ages can enhance the player experience and make the gaming experience more immersive and believable.

This specification describes an end-to-end system for generating natural sounding voices that change given a desired age group. An age classifier model is used to obtain a representative age embedding of audio samples of speech in a target age range. This embedding is used to condition an age convertor model that converts a speech sample of an individual into a speech sample of the individual in the target range.

Figure 1:
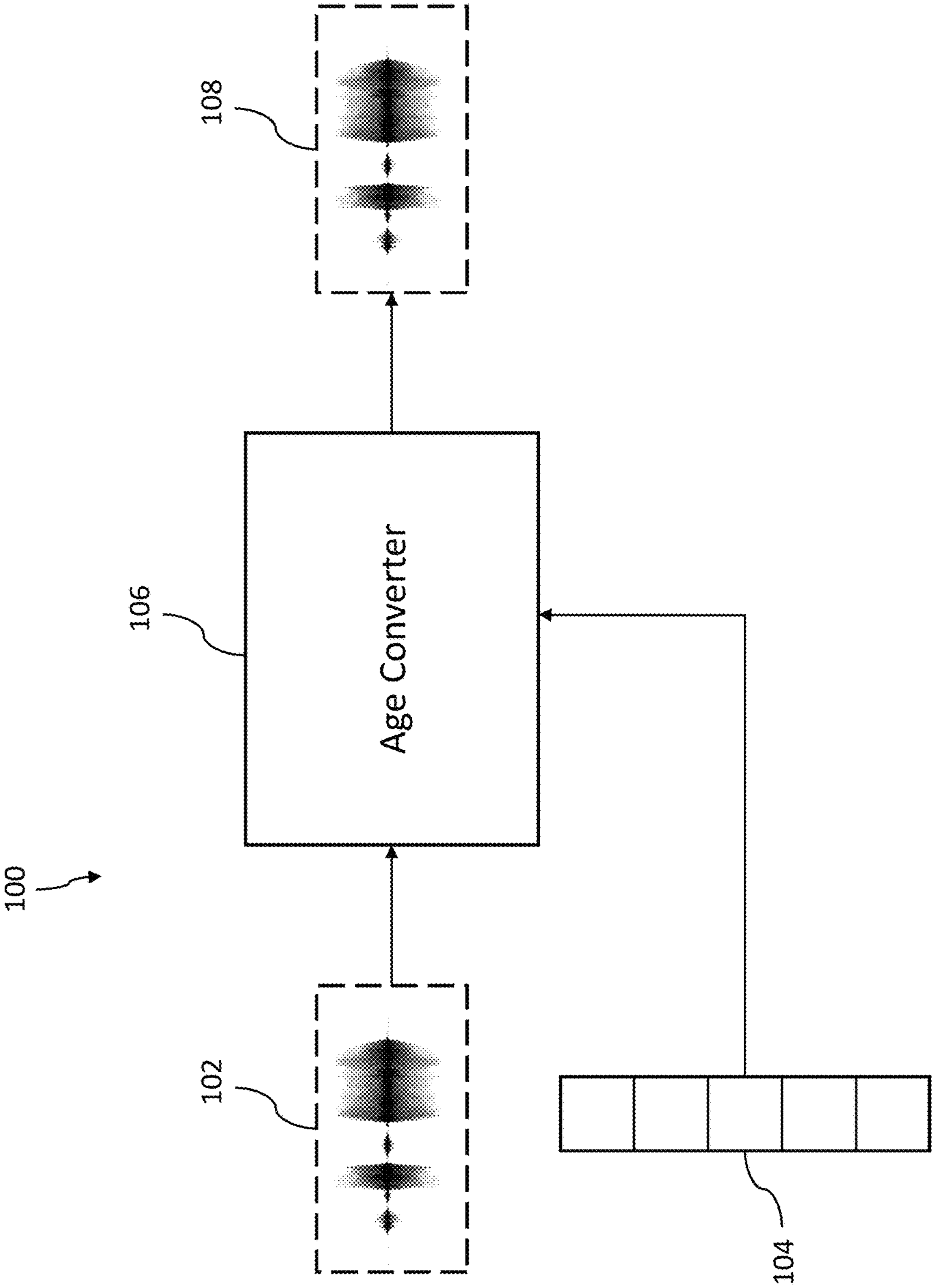
FIG. 1 shows a schematic overview of an example method for aging speech audio data.

FIG. 1 shows an overview of an example method too for aging speech audio data. A sample of speech audio data 102 (also referred to herein as an "initial audio sample") of an individual is input into an age convertor model 106, along with an age embedding 104 corresponding to a target age category. The age convertor model 106 processes the input speech audio sample 102, conditioned on the age embedding 104, to generate an output speech audio sample 108 corresponding to an estimate of an age-altered version of the input speech audio sample 102 in the target age category. The age convertor model 106 acts to alter the characteristics of the speech in the initial audio sample 102 such that the characteristics of the output speech audio sample 108 match characteristics of a speaker in the target age category.

For example, the initial audio sample 102 may correspond to a speaker in an "adult" category saying a particular phrase or sequence of words. The initial audio sample 102 is input into the age convertor model 106 along with an age embedding 104 corresponding to an "elderly" category. The age convertor model alters characteristics of the initial audio sample 102 to generate an output speech audio sample 108 that has characteristics of "elderly" speech, while maintaining the content of the particular phrase or sequence of words. The output audio sample 108 is effectively an elderly version of the speaker in the input sample 102 saying the same phrase.

The initial audio sample 102 comprises a speech audio sample, i.e. a sample of one or more spoken words or utterances. The speech audio sample may correspond to speech captured from an individual, for example at a known age. Alternatively, the speech audio sample may be synthetically generated speech, for example from a text-to-speech model. The initial audio sample 102 may be in the form of a way file, though other compressed or uncompressed representations of audio data may alternatively be used.

The age embedding 104 is an embedding that encodes characteristics of a target age category. The target age category is a target age category of the speaker in the output audio sample 108. For example, the target age category may correspond to: a generalised age group (e.g. "child", "young adult", "adult" or "elderly"); a target age range (e.g. 5-10 years old, 10-15 years old, 15-10 years old etc.); or a specific age.

The age embedding 104 may be in the form of an N-dimensional vector. It may be derived from an age classification model, for example as described in more detail below with reference to FIG. 2.

In some implementations, a gender of the speaker may also be taken into account when producing the age-altered speech audio sample 108 to account for different ways that male and female voices age. Typically, female voices change as a smooth function of age, whereas male voices exhibit sudden step changes. Furthermore, in adults, the pitch of female voices tends to fall over time, whereas the pitch of male voices tends to rise slightly. To account for this, data indicative of the gender of the speaker (not shown) may additionally be input into the age convertor model 106 to condition the age convertor model 106 on the speaker gender. Alternatively, different age convertor models 106 may be used depending on the gender of the speaker, i.e. there may be a separate male age convertor model that has been trained on male speech samples and a female age convertor model that has been trained on female speech samples.

The age convertor model 106 is a machine-learned model that has been trained to alter characteristics of input speech audio samples 102 to match characteristics of speech samples in a target age category defined by the age embedding 104. Examples of methods of training age convertor models 106 are described below with reference to FIG. 3. The age-embedding 104 for the desired age group is used to condition the age-convertor model 106 along with the acoustic features from the input speech audio sample 102, then obtain the acoustic features of an 'aged' audio file. These acoustic features may then be converted to a way file using any universal vocoder.

Examples of machine-learned models that may be used as the age convertor model 106 include neural networks; sequence-to-sequence deep neural networks, such as autoregressive LSTM models and/or transformers; or non-autoregressive models, such as GAN-based models and/or flow-based models.

The output sample of speech audio 108 is a speech audio sample that corresponds to the initial audio sample 102, but with the characteristics of speech in the target age category. The semantic content of the output sample of speech audio 108 (e.g. the utterances/words present) may otherwise be identical to the initial audio sample 102. The output sample 108 may be in the same format as the input sample, e.g. if the initial audio sample 102 is in the form of a way file, the output sample 108 will also be in the form of a way file.

The output sample of speech 108 may be played/output via speaker. Alternatively, or additionally, the output sample of speech 108 may be stored in a memory.

Figure 2:
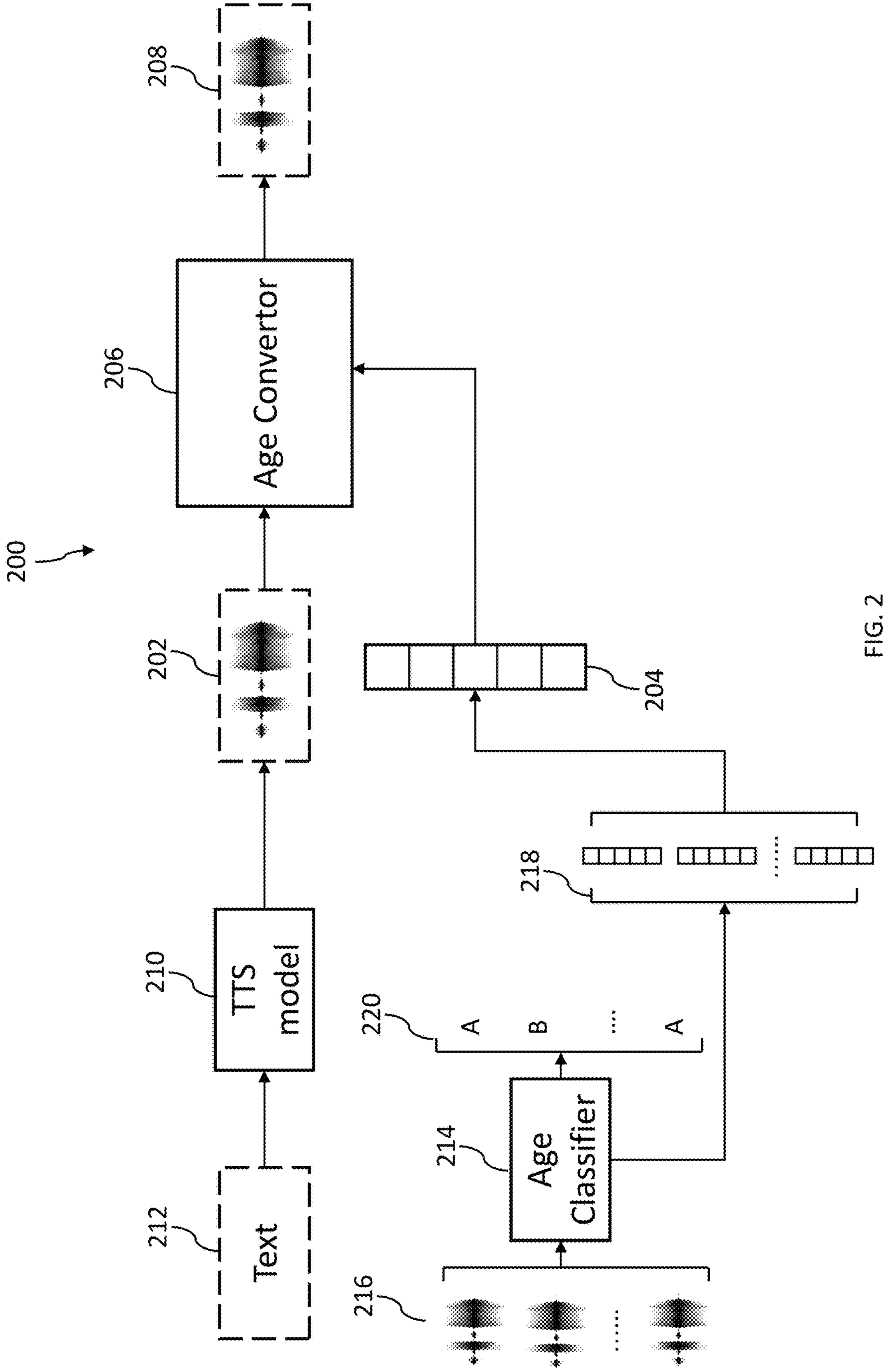
FIG. 2 shows a schematic overview of a further example method for aging speech audio data.

FIG. 2 shows a schematic overview of a further example method 200 for aging speech audio data. The method corresponds to the method of FIG. 1, with several additional features that may additionally be incorporated, either individually or together with one or more other features.

In the example shown, a text-to-speech (TTS) model 210 is used to generate the input speech audio sample 202 from text 212. The text-to-speech model 210 takes as input a text a segment of text 212 and process it to generate an audio version of the text, i.e. a spoken version of the text. The text 212 may correspond to, for example, lines of dialogue to be spoken by a character in a video game. Examples of text to speech models include, for example, sequence-to-sequence deep learning-based models, such as auto-regressive models, GANs or the like.

In some implementations, the TTS model is configured to generate speech in the form of a player voice, i.e. so that it sounds like the voice of the player of a videogame. This TTS model could be a model trained in the player's voice or a voice-converter model could be used to synthesize the line of text in the player's voice. It may be trained on input examples of the voice of the player. TTS models are typically trained on transcribed speech data from a speaker at a fixed age. The age convertor model 206 is used to convert the TTS-generated speech into speech in the target age category.

The age embedding 204 is generated based on a machine-learned age classifier model 214. The age classifier model 214 takes as input a speech audio sample and outputs an age classification 220 of the input audio, e.g. data indicative of an age category for the input speech audio, such as distribution over age categories for the input speech sample. Examples of age classifier models may include, but are not limited to: a convolutional neural network, a multi-layer perceptron and/or an autoregressive neural network.

The age embedding 204 for a particular target age category may be based on the age classifications of a plurality of input speech audio samples 216 in the target age category. For example, the age classification model 214 may be used to generate a sample embedding 218 for each of a plurality of input speech samples 216. These sample embedding 218 may then be averaged to generate the age embedding 204 for the target age range.

The sample embeddings 218 may correspond to an intermediate output of the age embedding model 214. Examples of such output include an output of an intermediate layer of the age embedding model 214, such as the layer immediately before a final softmax layer of the age embedding model 214.

The age embeddings 204 for each target age category may be pre-generated and stored in a memory until needed in the age-altering method 200. When the age altering method 200 is applied to a speech sample 202, the required age embedding 204 corresponding to the target age category is retrieved from the memory and input into the age convertor model 206 along with the initial speech audio sample 202 to be aged. The age convertor model 206 processes the initial speech audio sample 202 conditioned on the retrieved embedding vector 204 to generate the aged speech audio sample 208, as described in relation to FIG. 1.

Figure 3:
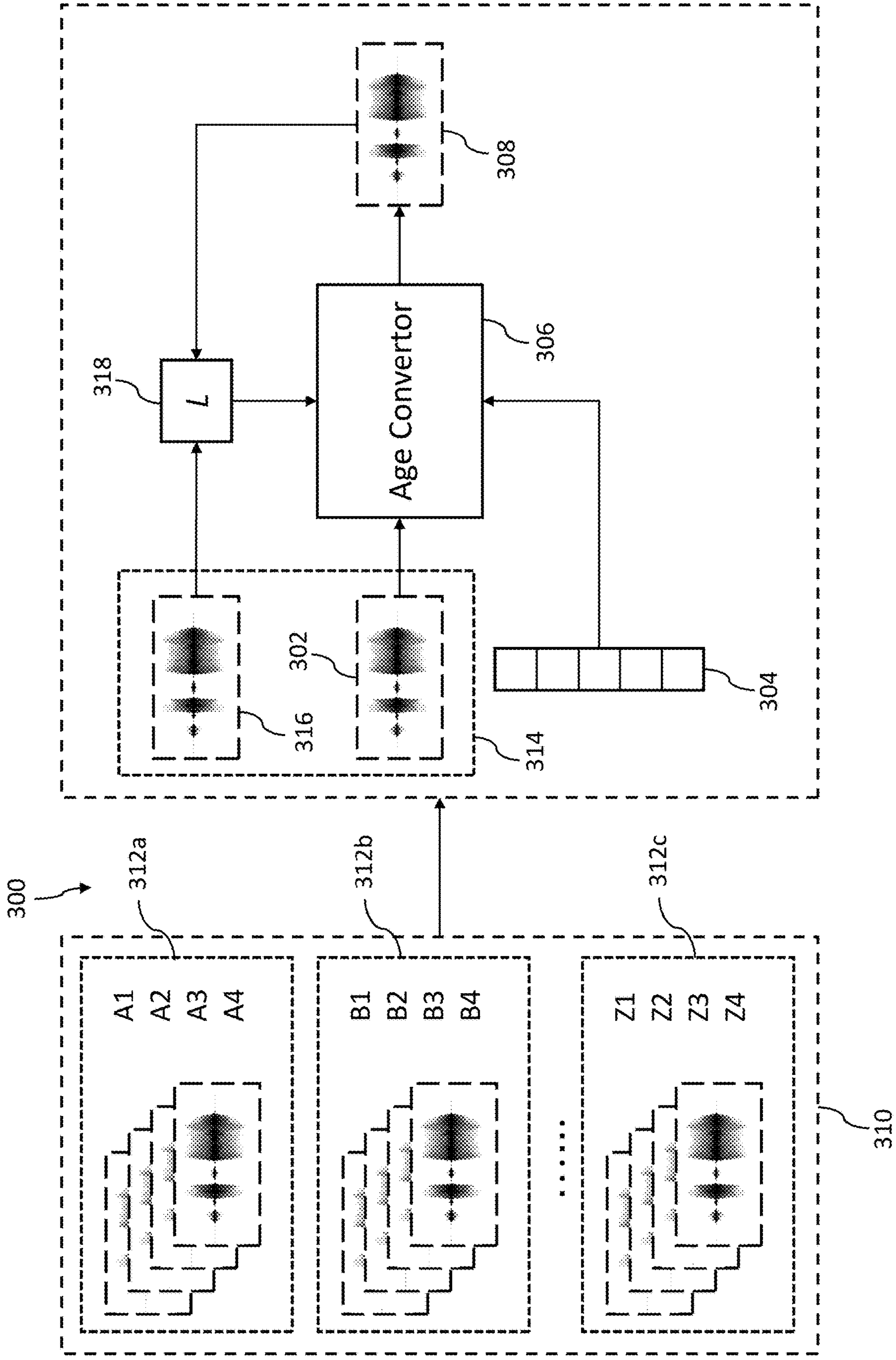
FIG. 3 shows a schematic overview of a method of training a machine-learned age convertor model.

FIG. 3 shows a schematic overview of a method 300 of training a machine-learned age convertor model, such as the model described above in relation to FIGS. 1 and 2.

The training method 300 uses a training dataset 310 comprising sets of training audio samples 312*a*-*c*. Each set of training audio samples 312*a*-*c* comprises a plurality of speech audio samples from a particular individual, each taken/recorded from said individual at a different age category, i.e. at different ages of the individual. For example, a set of training audio samples 312*a*-*c* may correspond to speech samples of a celebrity or politician taken throughout their career. Many other examples are possible. Each speech audio sample in a set of training audio samples 312*a*-*c* is labelled with the age category to which it corresponds (here denoted A1-4, B-14 and Z-4 for the first 312*a*, second 312*b*, and third 312*c* sets of audio samples respectively).

In some implementations, each speech audio sample is associated with a transcript (i.e. text representation) of the contents of the speech audio sample. A text-to-speech model may be used to generate an input speech audio sample for the age converter from the transcript, i.e. each recorded speech audio sample may have a corresponding TTS speech audio sample. Alternatively or additionally, each set of training audio samples 412*a*-*c* may comprise speech audio samples of an individual speaking the same words at different ages.

During training, training samples 314 are selected from the set of training audio samples 312*a*-*c*. Each training pair 314 comprises a first speech sample 302 and a second speech sample 316 (also referred to herein as a "ground truth speech sample"). The first speech sample 302 may comprise a recorded speech sample or a TTS speech sample. The second speech sample 316 is a recorded speech sample in the target age category corresponding to the words spoken in the first speech sample 302. Where the first speech sample 302 is a recorded speech sample, the second speech sample 316 is taken from the same speaker as the first speech sample.

The first speech sample 302 is input into an age convertor model 306 along with an age embedding 304 corresponding to the second age category (i.e. the target age category). The age convertor model 306 processes the input first speech sample 302 conditioned on the age embedding 304 and outputs a candidate speech sample 308. The candidate speech sample 308 is compared to the second speech sample 316, for example using an objective/loss function 318, and the results of the comparison are used to determine updates to parameters of the age convertor model 306.

Determining the loss/objective function 318 may comprise subtracting the candidate speech sample 308 from the second speech sample 316 (or vice versa) and taking a norm of the resulting signal. Examples of a loss/objective function that may be used to compare the candidate speech sample 308 with the second speech sample 316 include an L1 loss, an L2 loss or the like. In some embodiments, the loss/objective function 318 is calculated over a batch of training data comprising a plurality of training pairs 314.

To determine the parameter updates for the age convertor model 306, an optimization procedure may be applied to the loss function 318. Examples of such an optimization scheme include, but are not limited to, stochastic gradient descent. The optimization routine may be iterated until a threshold condition is met. The threshold condition may, for example, be a threshold number of training epochs and/or a threshold performance being reached on a validation dataset.

Figure 4:
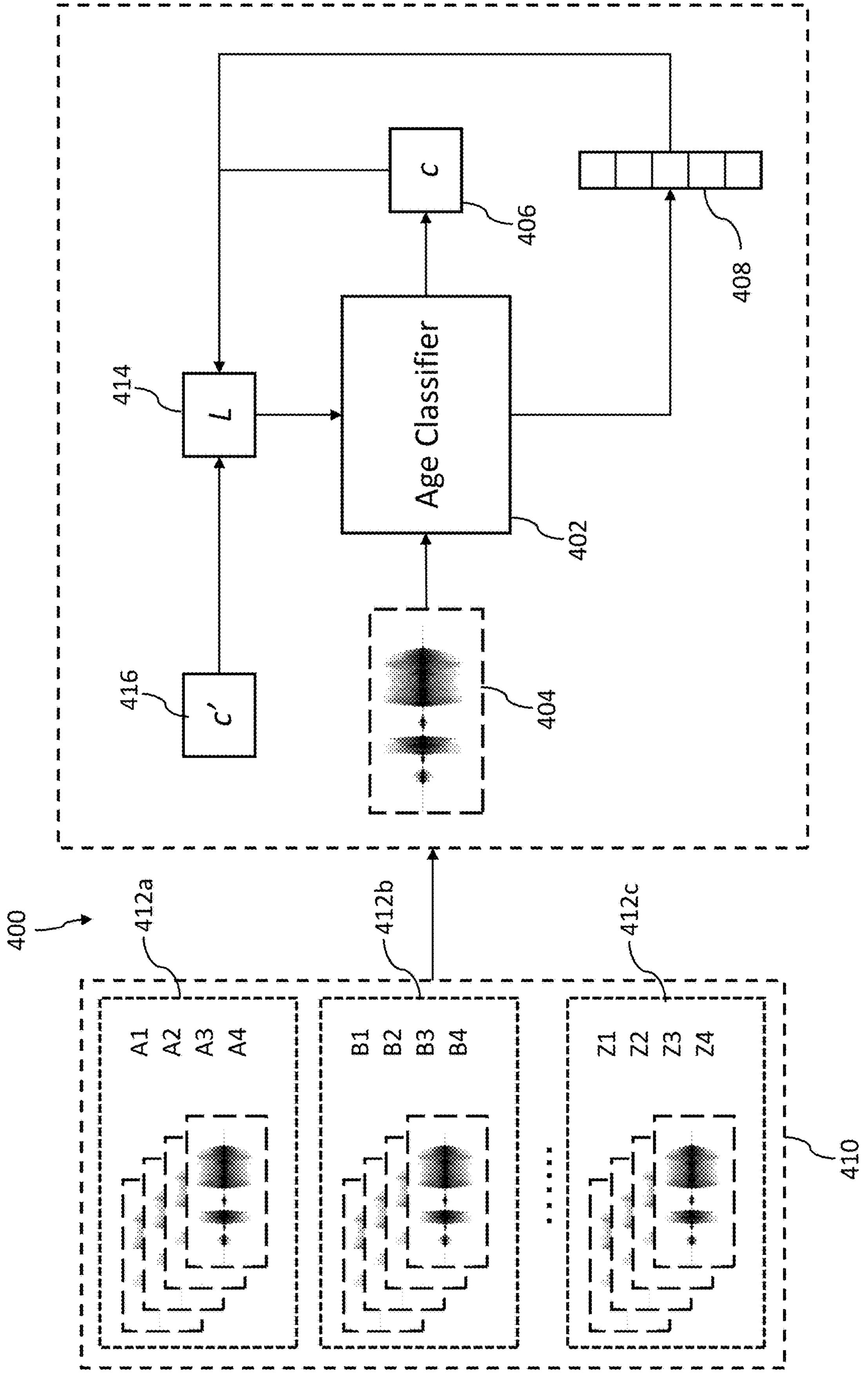
FIG. 4 shows a schematic overview of a method of training an age classification model.

FIG. 4 shows a schematic overview of a method of training an age classification 400 model. The method may be implemented by one or more computing systems.

The age classifier model 402 trained using a training dataset 410 comprising sets of training audio samples 412*a-c*. Each set of training audio samples 412*a-c* comprises a plurality of speech audio samples from a particular individual, each taken from said individual at a different age category, i.e. at different ages of the individual. For example, a set of training audio samples 412*a-c* may correspond to speech samples of a celebrity or politician taken throughout their career. Many other examples are possible. Each speech audio sample in a set of training audio samples 412*a-c* is labelled with the age category to which it corresponds (here denoted A1-4, B-14 and Z-4 for the first 412*a*, second 412*b*, and third 412*c* sets of audio samples respectively). These age categories may be referred to herein as "ground truth age classifications/categories".

The age classifier model 402 takes as input a speech audio sample 404 and outputs data indicative of an age classification 406 for the input speech audio sample 404. For example, the data indicative of an age classification 406 may be a distribution over a plurality of age categories. An age embedding 408 can also be derived from the age classification model 402, for example by taking an intermediate output of the age classification model 402. Such an intermediate output of the age classification model 402 may correspond to the output of a layer of the age classification model 402, such as the final layer before a softmax layer that generates the output classification 406 of the age classification model 402.

The age classifier model 402 is a parametrized classification model. It may be a neural network model comprising a plurality of neural network layers. Each layer comprises a plurality of neural network nodes. Output from the nodes of a layer is used as input to nodes in the next layer. Each node is associated with one or more weights and/or biases that are used to apply a transformation to the inputs of said node. Examples of such age classifier models include fully connected deep neural networks (DNNs), convolutional neural networks (CNNs) and autoregressive models.

During training, an input speech audio sample 404 is selected from the training dataset 410 and used to generate a candidate age embedding 408 and a candidate age classification 406. A loss function 414 (also referred to herein as an objective function) is determined based on the candidate age classification 406, a ground truth age classification 416 of the input speech audio sample 404 and the candidate age embedding 408. Based on the loss function 414, updates to parameters of the age classification model 402 are determined. In some implementations, the loss function 414 is determined based on a plurality of input speech audio samples 404 and their corresponding candidate age classifications 406, age embeddings 408 and ground truth age classifications 416. The training process may be iterated until a threshold condition is satisfied, such as a threshold number of training iterations and/or a threshold performance on a validation dataset being met.

In some implementations, the loss function 414 comprises a classification loss. The classification loss compares the candidate classification 406 output by the age classifier 402 to the ground truth age classification 416 of the corresponding input speech audio sample 404. Examples of such classification losses include a cross-entropy loss. Many other examples will be familiar to the skilled person.

The loss function 414 may further comprise an inter-speaker loss. The inter-speaker loss compares candidate age embeddings 408 from different speakers in the same age category and penalizes differences between these age embeddings. The inter-speaker loss thus encourages the age classifier model to generate similar age embeddings for speakers in the same age category. Examples of such an inter-speaker loss include a sum of norms of differences between candidate age embeddings 408.

The loss function 414 may further comprise an intra-speaker loss. The intra-speaker loss compares candidate age embeddings 408 from the same speaker in different age categories and penalizes similarities between these age embeddings. The intra-speaker loss thus encourages the age classifier model to generate different age embeddings for different age categories, even when the speaker is the same. Examples of such an inter-speaker loss include a sum of norms of differences between candidate age embeddings 408, though included in the overall loss function 414 with a different sign to the inter-speaker loss.

To determine the parameter updates, an optimization routine may be applied to the loss function 414. Examples of such an optimization routine include, but are not limited to, stochastic gradient descent.

In some implementations, the age classifier 402 may further be conditioned on a gender of the speaker of the input speech audio sample 404, i.e. the gender of the speaker is used as an additional input to the speech audio model. This can result in a more accurate age classification, since male and female voices typically have different characteristics and age differently.

Once trained, the age classifier 402 may be used to generate age embeddings for target age categories that can be used to condition the age convertor models described in relation to FIGS. 1-3. An age embedding for a particular age category may be generated by averaging over a set of age embeddings generated from the age classifier 402 corresponding to a set of speakers in that age category. In some embodiments, different age embeddings may be generated for male and female speakers in the same age category. Once generated, the age embeddings may be stored in a memory for later use.

Figure 5:
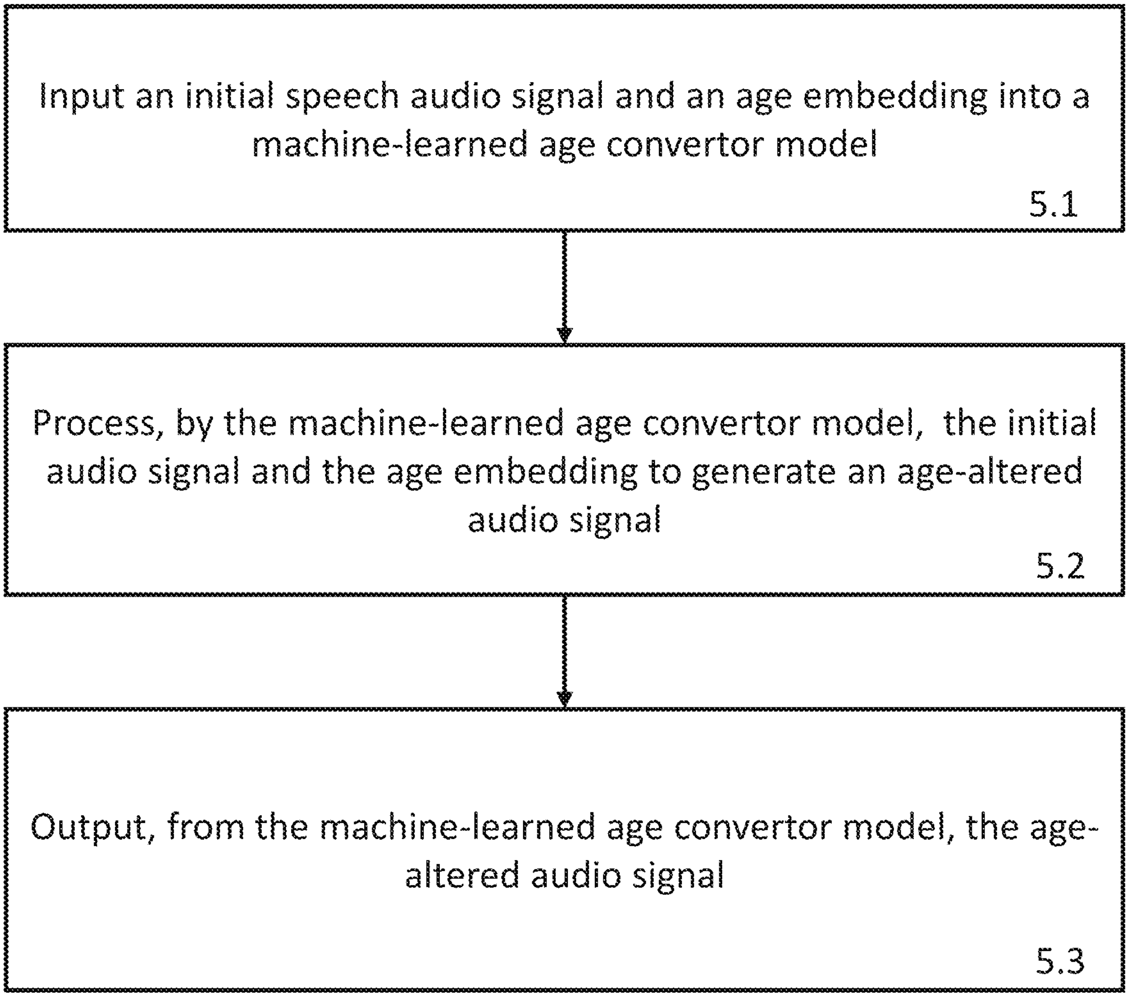
FIG. 5 shows a flow diagram of an example method for aging speech audio data.

FIG. 5 shows a flow diagram of an example method for aging speech audio data. The method may be performed by one or more computing devices/systems, for example as described in relation to FIG. 8.

At operation 5.1, an initial speech audio sample and an age embedding is input into a machine-learned age convertor model. The initial speech audio sample may be a time-domain audio sample comprising a speech sample. It may, for example, be in the form of a way file. The speech sample may correspond to speech of a character in a video game.

The machine-learned age convertor model is may, for example, be an autoregressive sequence-to-sequence model; LSTM model; GAN-based mode; or a transformer model, though it will be appreciated that other machine-learning models may alternatively be used.

In some implementations, the initial speech audio sample is generated from text using a text-to-speech model. Examples of text to speech models include, for example, deep learning-based models, such as auto-regressive models, GANs or the like. Alternatively, the initial speech audio sample may be a pre-recorded speech sample taken from an individual.

The age embedding is based on an age classification of a plurality of speech audio samples of subjects in a target age category. The age embedding may be derived from/using an age classification model. The age classification model is a machine-learned model that takes as input a speech audio sample an outputs an age classification of the input sample. The age classification model may comprise, for example, a neural network, a convolutional neural network, a deep neural network or an autoregressive model.

The age classification model may comprise a plurality of layers, for example neural network layers. In these implementations, the age embedding may be generated from output of a layer of the age classification model. For example, the output of the last layer (before a softmax layer) may be used to generate the age embedding. In some implementations, the age embedding is an average of a plurality of sample embeddings, each sample embedding corresponding to an output from a layer of the age classification model with different input speech samples in the same age category.

In some implementations, the method further comprises inputting a representation of a target gender into the machine-learned age convertor model. In such implementations, the age-altered audio signal further corresponds to an audio signal with the target gender. For example, the representation of the target gender may encode whether the speaker is a male or female. Such a representation may, for example, be a binary encoding.

At operation 5.2, the machine-learned age convertor model processes the initial speech audio sample to generate an age-altered audio signal. The age-altered audio signal is a speech audio signal corresponding to a version of the initial speech audio sample, but in the target age category. In other words, the voice characteristics of the initial speech audio sample are altered to change the apparent age of the speaker, while maintaining the sematic content of the speech audio sample.

The machine-learned age convertor model processes the input speech sample based on learned parameters of the model. The parameters of the model may, for example, be weights and biases of neural network nodes in the model. Where the model is a layered model, the output of each layer before the final layer may be used as an input to one or more subsequent layers of the model. Each layer transforms its input based on the parameters associated with said layer to generate the layer output.

At operation 5.3, the machine-learned ager convertor model outputs the age-altered audio signal. The age-altered audio signal corresponds to a version of the initial audio signal in the target age category.

The output age-altered audio signal may then be played via a speaker.

Figure 6:
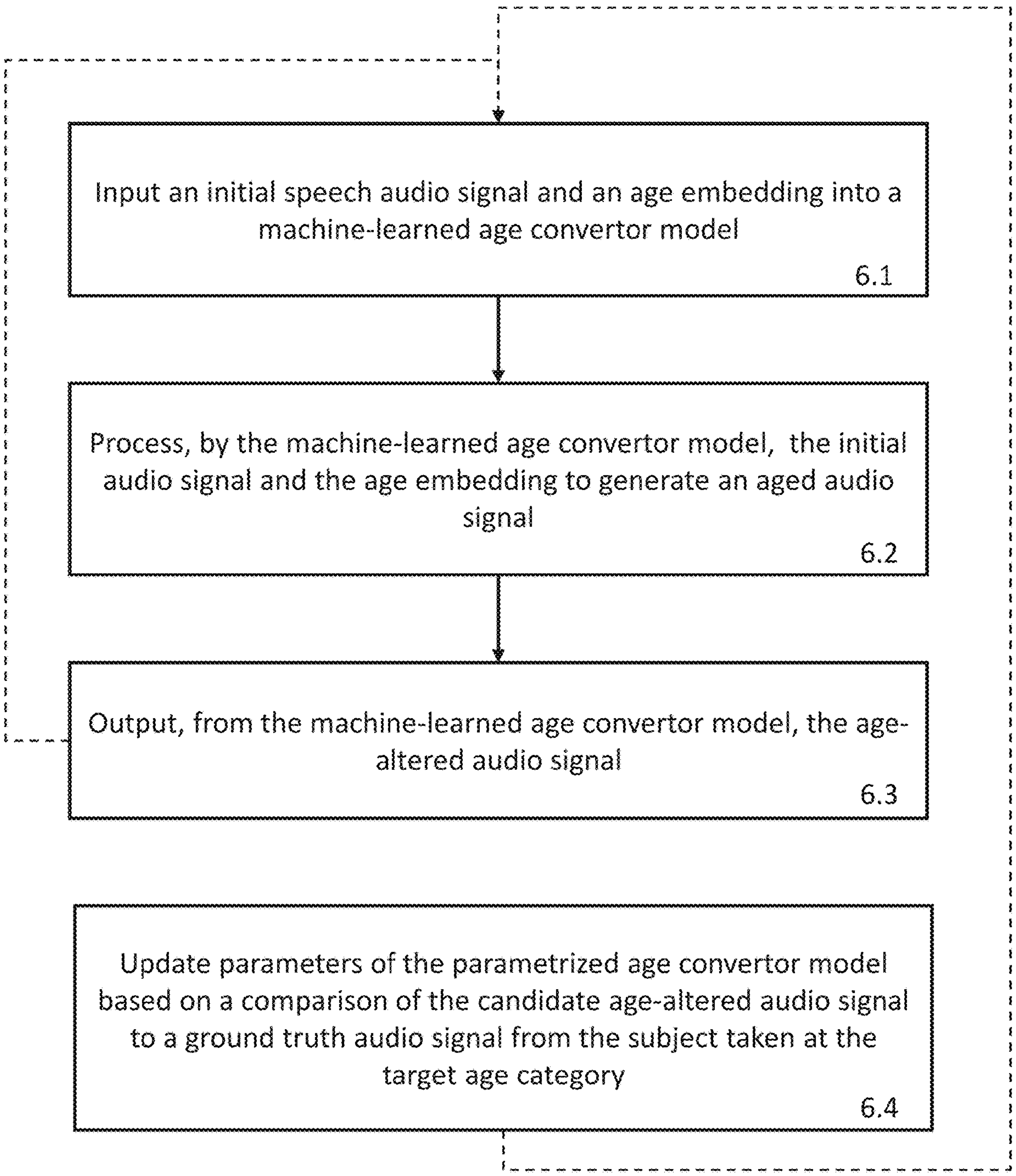
FIG. 6 shows a flow diagram of an example method of training a machine-learned age convertor model.

FIG. 6 shows a flow diagram of an example method of training a machine-learned age convertor model. The method may be performed by one or more computing devices/systems, for example as described in relation to FIG. 8.

At operation 6.1, an initial speech audio sample selected from a training dataset and an age embedding corresponding to a target age category are is input into an age convertor model. The target age category corresponds to an age category of a ground truth speech sample taken from the same speaker as the initial speech audio sample.

The training dataset comprises a plurality of speech audio samples, each labelled with a speaker and a ground truth age category. The speech audio samples in the training data may, for example, correspond to samples of speech taken from celebrities and/or politicians throughout their careers.

The age embedding may be derived from/using an age classification model. For example, it may correspond to an average over intermediate outputs of an age classification model for a plurality of speech samples in the target age category. The intermediate output may be the output of an intermediate layer of the age classification model, such as the final layer before a softmax layer of the model that outputs the age classification/a distribution over age classifications.

In some implementations, a data indicative of the gender of the speaker is also input into the age convertor in order to condition the age convertor on the speaker gender. In such implementations, the age embedding may also be generated from speech samples of the corresponding gender.

The machine-learned age convertor model is may, for example, be an autoregressive sequence-to-sequence model; LSTM model; GAN-based mode; or a transformer model, though it will be appreciated that other machine-learning models may alternatively be used At operation 6.2, the age convertor model processes the initial audio signal and the age embedding to generate a candidate age-altered audio signal. The age convertor model processes the initial audio signal based on current values of parameters of the age convertor model, conditioned on the age embedding.

At operation 6.3, the candidate age-altered audio signal is output from the age convertor model. The candidate age-altered audio signal represents a current estimate of a version of the input speech audio sample in the target age category, based on the current parameters of the age convertor model.

Operations 6.1 to 6.3 may be iterated over a batch of training data to generate a plurality of candidate age-altered audio signals, each corresponding to a different input speech audio sample and/or target age category.

At operation 6.4, parameters of the of the parametrized age convertor model are updated based on a comparison of the candidate age-altered audio signal to a ground truth audio signal from the subject taken at the target age category.

Updating parameters of the parametrized age convertor model based may comprise determining a loss between the candidate age-altered audio signal and the ground truth audio signal, i.e. the speech audio sample from the training dataset corresponding to a speech sample of the speaker in the target age category. The loss may be based on a norm of the difference between the candidate age-altered audio signal and the ground truth audio signal, such as an L1 or L2 norm. The loss may be based on the comparison of a plurality of candidate age-altered audio signals to their corresponding ground truth audio signals, i.e. the results of applying operations 6.1 to 6.3 a plurality of times.

The parameters of the parametrized age convertor model are updated based on the loss. For example, an optimization routine, such as stochastic gradient descent, may be applied to the loss with the goal of minimising the loss with respect to the model parameters. Examples of such optimization routines include stochastic gradient descent.

Operations 6.1 to 6.4 may be iterated a plurality of times until a threshold condition is satisfied, where each iteration used the values of the model parameters determined at the previous iteration. The threshold condition may be a threshold performance on a test dataset and/or a threshold number of training epochs.

Figure 7:
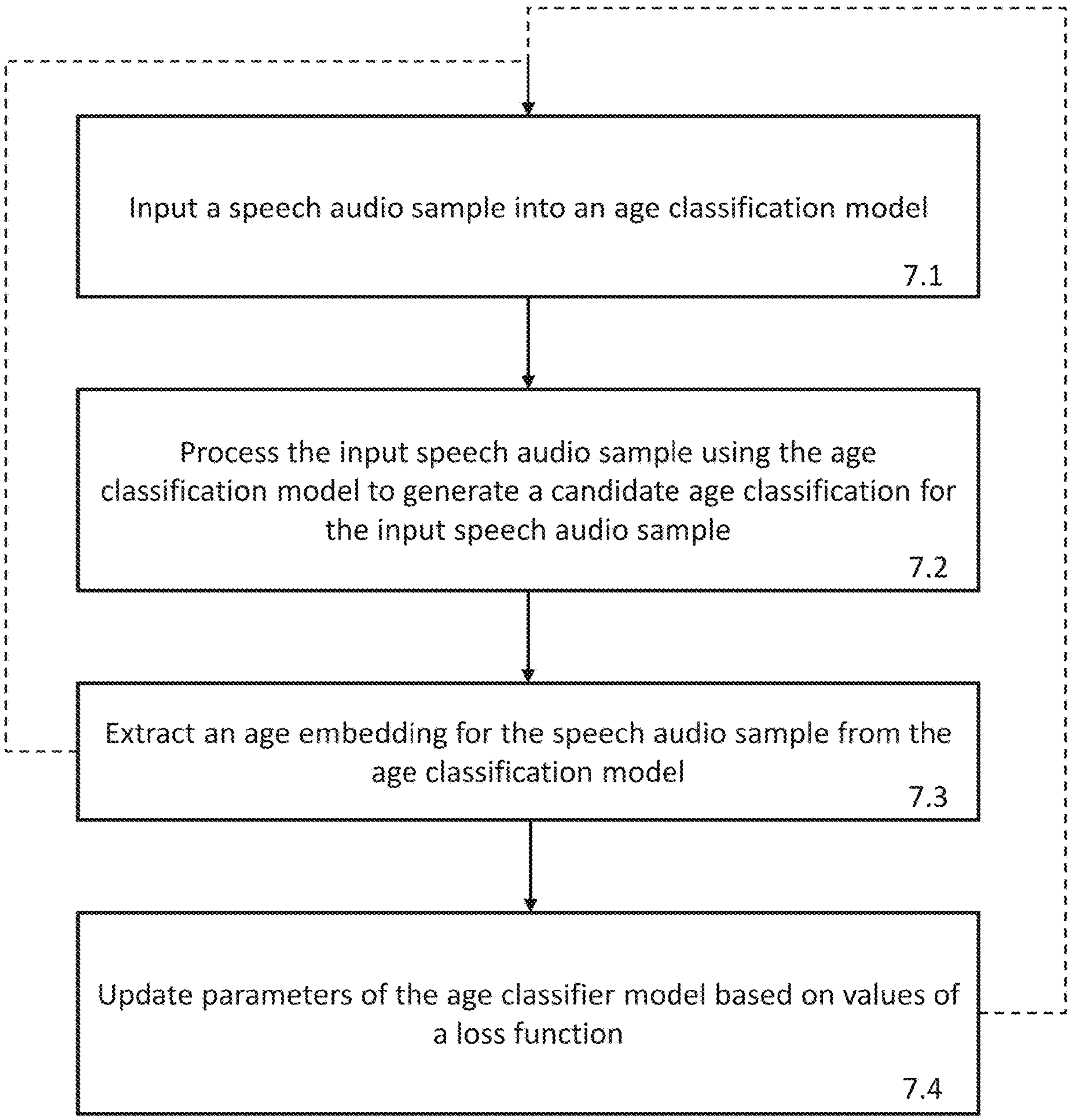
FIG. 7 shows a flow diagram of an example method of training an age classification model.

FIG. 7 shows a flow diagram of an example method of training an age classification model. The method may be performed by one or more computing devices/systems, for example as described in relation to FIG. 8.

At operation 7.1, a speech audio sample is input into an age classifier model. The speech audio sample is taken from a training dataset of labelled speech audio samples, where each speech audio sample is labelled with a corresponding age category (also referred to as a "ground-truth age category"). The age classifier model may comprise a parameterized layered model, such as a neural network, a convolutional neural network, a deep neural network or autoregressive model. The final layer of the age classifier may be a softmax layer.

At operation 7.2, the age classifier model processes the speech audio sample based on current parameters of the age classifier model to generate a candidate age classification for the input speech audio sample. The age classifier model may process the input speech audio sample through a plurality of neural network layers, each layer taking as input the output of a previous layer.

The age classification comprises data indicative of an age category that the input speech sample belongs to. It may comprise a distribution over a plurality of age categories. The age categories may be age ranges, specific ages or descriptive categories (such as "young", "adult", "elderly" etc.).

At operation 7.3, an age embedding for the speech audio sample is extracted from the age classifier model. The embedding may correspond to an intermediate output of the age classifier model, such as the output of one of the layers of the age classifier model. For example, the age embedding may correspond to the output of the layer immediately before the final softmax layer of the age classifier model. The age embedding may be in the form of an N-dimensional vector.

Operations 7.1 to 7.3 may be iterated over a batch of training data to generate a plurality of candidate age classifications and age embeddings.

At operation 7.4, parameters of the age classifier model are updated based on values of a loss function. An optimization routine, such as stochastic gradient descent, may be applied to the loss function to determine the parameter updates.

The loss function comprises a classification loss taken between the candidate age classifications and the corresponding ground truth age classifications of the speech audio samples. Such a classification loss may, for example, comprise a cross entropy loss or an L2 loss between the ground truth age classification and a distribution over age categories output by the age classifier.

The loss function further comprises an age embedding loss that compares a plurality of age embeddings of audio speech samples with the same ground truth age classification. In other words, the age embedding loss compares embeddings of speech samples in the same age category with each other. The age embedding loss penalizes differences in age embeddings of speech samples in the same age category, in effect encouraging the age classifier to generate similar embeddings for speech samples in the same age category, no matter what the identity of the speaker is. The age embedding loss may, for example, be a norm, such as an L2 norm, between pairs of age embeddings from samples in the same age category. The age embedding loss may have a positive coefficient in the loss function.

The loss function may further comprise an identity loss. The identity loss compares age embeddings of audio speech samples from different ground truth age classifications that captured from an identical individual. In other words, the identity loss compares age embeddings for the same speaker taken at different ages. The identity loss penalizes similar embeddings of audio speech samples from the same speaker at different ages, in effect encouraging the age classifier model to generate speaker-agnostic age embeddings. The identity loss may, for example, be a norm, such as an L2 norm, between pairs of age embeddings from samples in the different age categories from the same speaker. The identity loss may have a negative coefficient in the loss function.

Operations 7.1 to 7.4 may be iterated until a threshold condition is satisfied. The threshold condition may be a threshold number of training epochs and/or a threshold performance on a test dataset.

Figure 8:
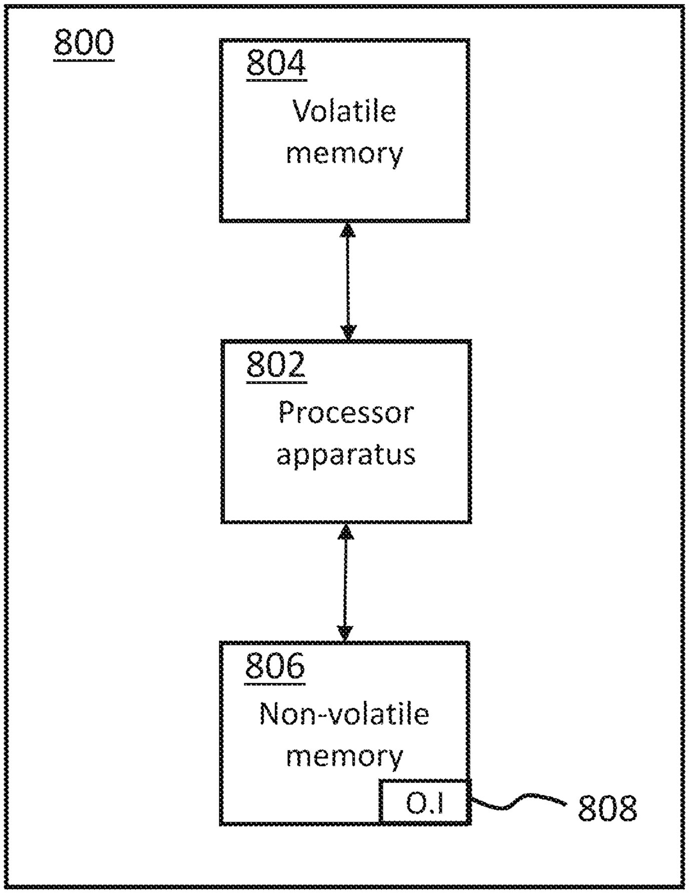
FIG. 8 shows a schematic overview of a computing system.

FIG. 8 shows a schematic overview of a computing system for performing any of methods described herein. The system/apparatus shown is an example of a computing device. It will be appreciated by the skilled person that other types of computing devices/systems may alternatively be used to implement the methods described herein, such as a distributed computing system.

The apparatus (or system) 800 comprises one or more processors 802. The one or more processors control operation of other components of the system/apparatus 800. The one or more processors 802 may, for example, comprise a general purpose processor. The one or more processors 802 may be a single core device or a multiple core device. The one or more processors 802 may comprise a central processing unit (CPU) or a graphical processing unit (GPU). Alternatively, the one or more processors 802 may comprise specialized processing hardware, for instance a RISC processor or programmable hardware with embedded firmware. Multiple processors may be included.

The system/apparatus comprises a working or volatile memory 804. The one or more processors may access the volatile memory 804 in order to process data and may control the storage of data in memory. The volatile memory 804 may comprise RAM of any type, for example Static RAM (SRAM), Dynamic RAM (DRAM), or it may comprise Flash memory, such as an SD-Card.

The system/apparatus comprises a non-volatile memory 806. The non-volatile memory 806 stores a set of operation instructions 808 for controlling the operation of the processors 802 in the form of computer readable instructions. The non-volatile memory 806 may be a memory of any kind such as a Read Only Memory (ROM), a Flash memory or a magnetic drive memory.

The one or more processors 802 are configured to execute operating instructions 808 to cause the system/apparatus to perform any of the methods described herein. The operating instructions 808 may comprise code (i.e. drivers) relating to the hardware components of the system/apparatus 800, as well as code relating to the basic operation of the system/apparatus 800. Generally speaking, the one or more processors 802 execute one or more instructions of the operating instructions 808, which are stored permanently or semi-permanently in the non-volatile memory 806, using the volatile memory 804 to temporarily store data generated during execution of said operating instructions 808.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 8, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A method for aging speech audio data, the method comprising:

inputting an initial audio signal and an age embedding into a machine-learned age convertor model, wherein:

the initial audio signal comprises speech audio; and the age embedding is generated, in a form of an N-dimensional vector, based on an output of an intermediate layer of an age classification model trained for age classification, using a plurality of speech audio samples of subjects in a target age category;

processing, by the machine-learned age convertor model, the initial audio signal and the age embedding to generate an age-altered audio signal, wherein the age-altered audio signal corresponds to a version of the initial audio signal in the target age category; and outputting, from the machine-learned age convertor model, the age-altered audio signal.

2. The method of claim 1, wherein the age embedding is generated using the age classification model, the age classification model taking as input an input audio sample and outputting an age classification of the input audio sample.

3. The method of claim 2, wherein the age classification model comprises a plurality of layers that includes the intermediate layer of the age classification model.

4. The method of claim 2, wherein the age embedding is based on an average of a plurality of sample embeddings, each sample embedding generated from an audio sample in the target age category using the age classification model.

5. The method of claim 2, wherein the age classification model comprises one or more of: a neural network; a convolutional neural network; a deep neural network; or an autoregressive model.

6. The method of claim 1, wherein the initial audio signal is generated from text using a text-to-speech model.

7. The method of claim 6, wherein the text is character dialogue in video game.

8. The method of claim 1, wherein the machine-learned age convertor model comprises: an autoregressive sequence-to-sequence model; LSTM model; GAN-based mode; or a transformer model.

9. The method of claim 1, wherein the method further comprises inputting a representation of a target gender into the machine-learned age convertor model, and wherein the age-altered audio signal further corresponds to an audio signal with the target gender.

10. A method of training a machine-learned age convertor model, the method comprising:

inputting an initial audio signal and an age embedding into a parametrized age convertor model, wherein:

the initial audio signal comprises speech; and the age embedding is generated, in a form of an N-dimensional vector, based on an output of an intermediate layer of an age classification model trained for age classification, using a plurality of speech audio samples of subjects in a target age category;

processing, by the parametrized age convertor model, the initial audio signal and the age embedding to generate a candidate age-altered audio signal;

outputting, from the parametrized age convertor model, the candidate age-altered audio signal; and updating parameters of the parametrized age convertor model based on a comparison of the candidate age-altered audio signal to a ground truth audio signal taken at the target age category.

11. The method of claim 10, wherein the age embedding is generated using the age classification model, the age classification model taking as input an input audio sample and outputting an age classification of the input audio sample.

12. The method of claim ii, wherein the age classification model comprises a plurality of layers that includes the intermediate layer of the age classification model.

13. The method of claim ii, wherein the age embedding is based on an average of a plurality of sample embeddings, each sample embedding generated from an audio sample in the target age category using the age classification model.

14. The method of claim ii, wherein the age classification model comprises one or more of: a neural network; a convolutional neural network; a deep neural network; or an autoregressive model.

15. The method of claim 10, wherein updating parameters of the parametrized age convertor model based on a comparison of the candidate age-altered audio signal to the ground truth audio signal taken at the target age category comprises:

determining a loss between the candidate age-altered audio signal and the ground truth audio signal, wherein the loss is based on a norm of the difference between the candidate age-altered audio signal and the ground truth audio signal; and updating the parameters of the parametrized age convertor model based on the loss.

16. The method of claim 10, wherein the machine-learned age convertor model is an autoregressive sequence-to-sequence model; LSTM model; GAN-based mode; or a transformer model.

17. A method of training an age classifier model to generate age embeddings of speech audio signals, the method comprising:

for each of a plurality of speech audio samples, each associated with a ground truth age classification:

inputting the speech audio sample into an age classification model;

processing the input speech audio sample using the age classification model to generate a candidate age classification for the input speech audio sample; and extracting an age embedding in a form of an N-dimensional vector for the speech audio sample from an intermediate layer of the age classification model, using a plurality of speech audio samples of subjects in a target age category; and updating parameters of the age classifier model based on values of a loss function, wherein the loss function comprises:

a classification loss between the candidate age classifications and the corresponding ground truth age classifications of the plurality of speech audio samples; and an age embedding loss comparing a plurality of age embeddings of audio speech samples with the same ground truth age classification.

18. The method of claim 17, wherein the age embedding loss penalises differences between the plurality of age embeddings of audio speech samples with the same ground truth age classification.

19. The method of claim 17, wherein the loss function further comprises an identity loss comparing the plurality of age embeddings of audio speech samples from different ground truth age classifications that captured from an identical individual, wherein the identity loss penalises similar embeddings of audio speech samples.

20. The method of claim 17, wherein the age classifier model comprises a neural network, a convolutional neural network, a fully connected neural network or autoregressive model.

* * * * *